(12) United States Patent
Austin et al.

(10) Patent No.: US 11,387,525 B2
(45) Date of Patent: Jul. 12, 2022

(54) TWO-STAGE PLUNGER PRESS SYSTEMS AND METHODS FOR FORMING BATTERY CELL TABS

(71) Applicant: GM GLOBAL TECHNOLOGY OPERATIONS LLC, Detroit, MI (US)

(72) Inventors: Alexandra J. Austin, Royal Oak, MI (US); Robert H. Dietze, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 16/812,908

(22) Filed: Mar. 9, 2020

(65) Prior Publication Data
US 2021/0280836 A1 Sep. 9, 2021

(51) Int. Cl.
| | |
|---|---|
| B21D 5/16 | (2006.01) |
| H01M 50/514 | (2021.01) |
| B21D 11/22 | (2006.01) |
| B21D 11/10 | (2006.01) |
| H01M 50/531 | (2021.01) |

(52) U.S. Cl.
CPC ............ *H01M 50/531* (2021.01); *B21D 5/16* (2013.01); *B21D 11/10* (2013.01); *B21D 11/22* (2013.01); *H01M 50/514* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 5,023,752 | A | 6/1991 | Defter et al. |
| 6,103,075 | A | 8/2000 | Winsel et al. |
| 6,639,385 | B2 | 10/2003 | Verbrugge et al. |
| 6,641,942 | B1 | 11/2003 | Rouillard et al. |
| 7,109,685 | B2 | 9/2006 | Tate, Jr. et al. |
| 7,324,902 | B2 | 1/2008 | Verbrugge et al. |

(Continued)

FOREIGN PATENT DOCUMENTS

| | | | |
|---|---|---|---|
| CN | 203026577 U | * | 6/2013 |
| CN | 210208184 U | * | 3/2020 |

(Continued)

*Primary Examiner* — Ula C Ruddock
*Assistant Examiner* — Anna Korovina
(74) *Attorney, Agent, or Firm* — Quinn IP Law (57) ABSTRACT

Presented are metalworking systems for forming metallic workpieces, methods for making/operating such systems, and battery packs with cell terminals bent by a two-stage plunger press. A metalworking system includes a first plunger with a plunger cavity extending through the first plunger's body, and one or more die cavities recessed into the first plunger's contact face. The die cavity includes one surface that contacts and bends a first workpiece a first angle, and another surface that contacts and bends a second workpiece a second angle. A second plunger includes one or more die cavities recessed into the second plunger's contact face. This die cavity includes one surface that contacts and bends the first workpiece a third angle, and another surface that contacts and bends the second workpiece a fourth angle. The second plunger passes through the plunger cavity such that the first and second plungers bend the metallic workpieces in tandem.

20 Claims, 5 Drawing Sheets

(56) References Cited

U.S. PATENT DOCUMENTS

| | | | |
|---|---|---|---|
| 7,373,264 B2 | 5/2008 | Verbrugge et al. |
| 7,612,532 B2 | 11/2009 | Verbrugge |
| 7,768,233 B2 | 8/2010 | Lin et al. |
| 7,928,690 B2 | 4/2011 | Koch et al. |
| 8,035,986 B2 | 10/2011 | Koetting et al. |
| 8,054,046 B2 | 11/2011 | Lin et al. |
| 8,108,160 B2 | 1/2012 | Liu et al. |
| 8,170,818 B2 | 5/2012 | Lin et al. |
| 8,198,864 B2 | 6/2012 | Koch et al. |
| 8,212,519 B2 | 7/2012 | Koch et al. |
| 8,321,164 B2 | 11/2012 | Liu et al. |
| 8,581,543 B2 | 11/2013 | Koch et al. |
| 8,645,088 B2 | 2/2014 | Schaefer et al. |
| 8,836,280 B2 | 9/2014 | Koch et al. |
| 9,172,118 B2 | 10/2015 | Marsh et al. |
| 9,176,194 B2 | 11/2015 | Meisner et al. |
| 9,178,192 B2 | 11/2015 | Payne |
| 9,337,484 B2 | 5/2016 | Verbrugge et al. |
| 9,354,277 B2 | 5/2016 | Lin et al. |
| 9,461,490 B2 | 10/2016 | Ying |
| 9,513,338 B2 | 12/2016 | Koch et al. |
| 2003/0235736 A1 | 12/2003 | Lin |
| 2011/0309838 A1 | 12/2011 | Lin et al. |
| 2014/0297084 A1 | 10/2014 | Meisner et al. |
| 2015/0017508 A1 | 1/2015 | Khakhalev |
| 2015/0162571 A1 | 6/2015 | Ogg et al. |
| 2015/0301116 A1 | 10/2015 | Baker et al. |
| 2015/0318502 A1 | 11/2015 | Kanai |
| 2016/0039419 A1 | 2/2016 | Wampler et al. |
| 2016/0077160 A1 | 3/2016 | Wampler, II et al. |
| 2016/0254562 A1 | 9/2016 | Morris-Cohen et al. |
| 2016/0259011 A1 | 9/2016 | Joe |
| 2016/0293991 A1 | 10/2016 | Goeltz et al. |
| 2016/0336552 A1 | 11/2016 | MacLean et al. |
| 2016/0372777 A1 | 12/2016 | Buckley et al. |
| 2017/0077507 A1 | 3/2017 | Harada et al. |
| 2018/0375132 A1 | 12/2018 | Li et al. |
| 2019/0126770 A1 | 5/2019 | Koch et al. |
| 2019/0157710 A1 | 5/2019 | Makino et al. |
| 2020/0212381 A1* | 7/2020 | Dietze ............... H01M 10/0404 |
| 2021/0283670 A1* | 9/2021 | Austin et al. |
| 2021/0288344 A1* | 9/2021 | Dietze ............... H01M 10/0404 |
| 2022/0029141 A1* | 1/2022 | Dietze ................. B21D 5/0236 |

FOREIGN PATENT DOCUMENTS

| | | | |
|---|---|---|---|
| CN | 211218194 U | * | 8/2020 |
| DE | 29604001 U1 | | 6/1996 |
| JP | 2002224752 A | | 8/2002 |
| JP | 2011206799 A | | 10/2011 |
| JP | 2020129483 A | * | 8/2020 |
| KR | 101880138 B1 | * | 7/2018 |
| WO | 2014116103 A1 | | 7/2014 |

* cited by examiner

TWO-STAGE PLUNGER PRESS SYSTEMS AND METHODS FOR FORMING BATTERY CELL TABS

INTRODUCTION

The present disclosure relates generally to metalworking techniques for forming metallic workpieces. More specifically, aspects of this disclosure relate to automated press systems for bending battery cell tabs in welding operations.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric ("electric-drive") vehicles, on the other hand, utilize alternative power sources to propel the vehicle and, thus, minimize or eliminate reliance on a fossil-fuel based engine for tractive power.

A full electric vehicle (FEV)—colloquially branded as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Most commercially available hybrid electric and full electric vehicles employ a rechargeable traction battery pack to store and supply the requisite power for operating the powertrain's traction motor unit(s). In order to generate tractive power with sufficient vehicle range, a traction battery pack is significantly larger, more powerful, and higher in capacity (Amp-hr) than a standard 12-volt starting, lighting, and ignition (SLI) battery. Contemporary traction battery packs (also referred to as "electric vehicle battery" or "EVB") group stacks of battery cells into individual battery modules that are mounted onto the vehicle chassis, e.g., via a battery housing or support tray. Stacked electrochemical battery cells may be connected in series or parallel through use of an electrical interconnect board (ICB). The electrical tabs of the individual battery cells, which project out from the module housing, are bent against and welded to shared busbar plates. A dedicated Battery Pack Control Module (BPCM), through collaborative operation with a Powertrain Control Module (PCM), regulates the opening and closing of battery pack contactors to govern which pack or packs will power the vehicle's traction motor(s) at a given time.

SUMMARY

Presented herein are metalworking systems with attendant control logic for forming metallic workpieces, methods for making and methods for operating such systems, and traction battery packs with discrete pairs of mixed material, mixed thickness battery cell tabs bent by a two-stage plunger press. By way of illustration, there are presented two-stage vertical plunger press systems for battery cell tab bend operations. During construction of a traction battery pack for a battery electric vehicle (BEV), for example, the individual battery pouch cells are stacked in face-to-face relation inside a battery module housing. For instance, the stacked battery cells are placed on a base plate, and subsequently covered with a module jacket bearing an integrated interconnect board (ICB) assembly. The cell tabs are contoured inside the housing and grouped together, e.g., into discrete stacks of three. These stacked cell tabs project outward from opposing ends of the battery module housing, extending through individual slots in the module jacket. In the foregoing example, a series of vertical slots may be formed into the endwalls of the module jacket, allowing the integrated ICB assembly to mount vertically onto the battery cells and comb the stacked cell tabs during ICB installation.

Once the battery module is assembled, the stacked cell tabs are bent, e.g., to a 90±5 degree (deg.) angle, into contact with ICB's electrical busbar plates; the cell tabs are thereafter welded, soldered, or clipped to the busbar plates. To provide the requisite bend, a two-stage plunger press with two (vertical) plungers progressively bends the cell tabs into flush contact with the busbar plates. A first-stage plunger is pressed against the stacked cell tabs and provides an initial bend, e.g., of 45±10 deg. Arcuate surfaces along terminal edges of the first-stage plunger's die cavities help to align the cell tab terminals with the die cavities and accommodate part-to-part variances as well as outward bowing of the terminals prior to bending. While the first-stage plunger is in situ, a second-stage plunger is passed through a complementary slot in the first-stage plunger to provide the final bend, e.g., an additional 45±10 deg. bend. For battery modules with mixed material, mixed thickness cell tabs/stacks (e.g., a positive (+) copper (Cu) terminal with a small-gauge thickness and a negative (−) aluminum (Al) terminal with a large-gauge thickness), the second-stage plunger may have distinct leg lengths and/or include die cavities with distinct pitches or distinct cavity surface lengths to provide a larger total bend distance for the thinner terminals.

Attendant benefits for at least some of the disclosed concepts include a die forming plunger mechanism that provides for opposing bend directions of mating pairs of cell tab terminals that are welded to the same busbar plate. This, in turn, allows for a reduction in the number and size of ICB busbar plates, resulting in vehicle mass and cost savings. In addition, the two-stage plunging process helps to ensure a sufficient final bend for flush terminal-to-busbar engagement without placing excessive back forces on the battery module and the related battery cells. With the foregoing features, disclosed plunger press systems, control logic, and methods accommodate differences in cell tab terminal thickness, part-to-part variances, and outwardly bowing terminals. Disclosed features may also help to minimize strain on the ICB and individual cells, and to reduce unwanted springback and bulging of the tabs.

Presented herein are automated manufacturing systems with attendant control logic for assembling battery modules of traction battery packs. In an example, there is presented an automated or manually operated metalworking system for forming neighboring metallic workpieces. The metalworking system includes a pair of telescoping (first and second) plungers for simultaneously bending planar (first and second) workpieces towards one another. A first-stage (first) plunger has a rigid (first) plunger body with a plunger cavity that extends through the first plunger's body, and one or more die cavities recessed into a downward-facing (first) contact face of the plunger body. A (first) die cavity includes one (first) cavity surface that presses and bends the first metallic workpiece a distinct (first) bend angle, and another (second) cavity surface that presses and bends the second metallic workpiece a distinct (second) bend angle. A second-stage (second) plunger has a rigid (second) plunger body with one or more die cavities recessed into a downward-facing (second) contact face of the second plunger's body. A (second) die cavity includes one (third) cavity surface that presses and bends the first metallic workpiece a distinct (third) bend angle, and another (fourth) cavity surface that presses and bends the second metallic workpiece a distinct (fourth) bend angle. The second plunger's body is movably received in the first plunger's body and passes through the plunger cavity such that the second plunger simultaneously bends the two metallic workpieces in tandem with the first plunger simultaneously bending the metallic workpieces.

Also presented herein are methods for manufacturing any of the disclosed battery modules and methods for operating any of the disclosed manufacturing systems. In an example, a method is presented for forming one or more neighboring pairs of metallic workpieces. This representative method includes, in any order and in any combination with any of the above and below disclosed options and features: aligning, with the workpieces, a first plunger including a first plunger body with a plunger cavity extending through the first plunger body and a first die cavity recessed into a first contact face of the first plunger body, the first die cavity including a first cavity surface configured to press against and bend a first metallic workpiece a first bend angle, and a second cavity surface configured to press against and bend a second metallic workpiece a second bend angle; aligning, with the workpieces, a second plunger including a second plunger body with a second die cavity recessed into a second contact face of the second plunger body, the second die cavity including a third cavity surface configured to press against and bend the first metallic workpiece a third bend angle, and a fourth cavity surface configured to press against and bend the second metallic workpiece a fourth bend angle; pressing the first plunger against and thereby simultaneously bending the first and second metallic workpiece towards each other; and pressing the second plunger, by moving the second plunger body into the first plunger body and through the plunger cavity, against and thereby simultaneously bending the first and second metallic workpieces towards each other in tandem with the first plunger bending the first and second metallic workpieces.

For any of the disclosed systems, methods, and devices, the first bend angle of the first cavity surface may be approximately 35-55 degrees (counterclockwise (CCW)) from the first contact face, and the second bend angle of the second cavity surface may be approximately 125-145 degrees (CCW) from the first contact face. In the same vein, the third bend angle of the third cavity surface may be approximately 45-65 degrees (CCW) from the second contact face, and the fourth bend angle of the fourth cavity surface may be approximately 115-135 degrees (CCW) from the second contact face.

For any of the disclosed systems, methods, and devices, the first die cavity may also include a first arcuate surface that extends between and connects the first cavity surface to the first contact face, and a second arcuate surface that extends between and connects the second cavity surface to the first contact face. The first die cavity may also include a first arcuate inflection surface that extends between and connects the first and second cavity surfaces. In this regard, the second die cavity may also include a third arcuate surface that extends between and connects the third cavity surface to the second contact face, and a fourth arcuate surface that extends between and connects the fourth cavity surface to the second contact face. The second die cavity may also include a second arcuate inflection surface that extends between and connects the third and fourth cavity surfaces.

For any of the disclosed systems, methods, and devices, the second plunger body may also include first and second legs that project generally orthogonally from a plunger crown. In this instance, the second die cavity is recessed into the first leg, and a fourth die cavity, configured like the second die cavity, is recessed into the second leg. The first plunger may optionally include a shoulder stop that extends across the plunger cavity and abuts the second plunger body to thereby limit the travel length of the second plunger through the plunger cavity.

For any of the disclosed systems, methods, and devices, each metallic workpiece may be composed of a stack of metal tabs. For some applications, the first metal tab stack has a first thickness (e.g., about 0.4 millimeters (mm)), and the second metal tab stack has a second thickness (e.g., about 0.2 mm) that is smaller than the first thickness. In this instance, the third cavity surface of the second plunger bends the first metal tab stack a first bend distance, and the fourth cavity surface bends the second metal tab stack a second bend distance that is greater than the first bend distance. As a further option, the length of the third cavity surface may be shorter than the length of the fourth cavity surface of the second die cavity. By comparison, the length of the first cavity surface may be approximately equal to the length of the second cavity surface of the first die cavity.

For any of the disclosed systems, methods, and devices, the first plunger may include two, three, four or more die cavities, each of which is recessed into the plunger body's downward-facing contact face. Each of the first plunger's die cavity includes one cavity surface that contacts and bends a respective metallic workpiece the first bend angle, and another cavity surface that contacts and bends another respective metallic workpiece the second bend angle. Likewise, the second plunger may include two, three, four or more die cavity, each of which is recessed into the second plunger body's downward-facing contact face. Each of these die cavities includes one cavity surface that contacts and bends a respective metallic workpiece the third bend angle, and another cavity surface that contacts and bends a respective metallic workpiece the fourth bend angle.

Additional aspects of the present disclosure are directed to techniques, algorithms, and control logic for operating any of the disclosed manufacturing systems or manufacturing any of the disclosed workpieces. Aspects of the present disclosure are also directed to traction battery packs with battery pouch cells with electrically conductive cell tabs that are formed in accordance with the disclosed concepts. Also presented herein are non-transitory, computer readable media storing instructions executable by at least one of one or more processors of one or more programmable control units, such as an electronic control unit (ECU) or control module, to govern operation of any disclosed system.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, and Detailed Description sections, but not explicitly set forth in the claims, should not be incorporated into the claims, singly or collectively, by implication, inference, or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
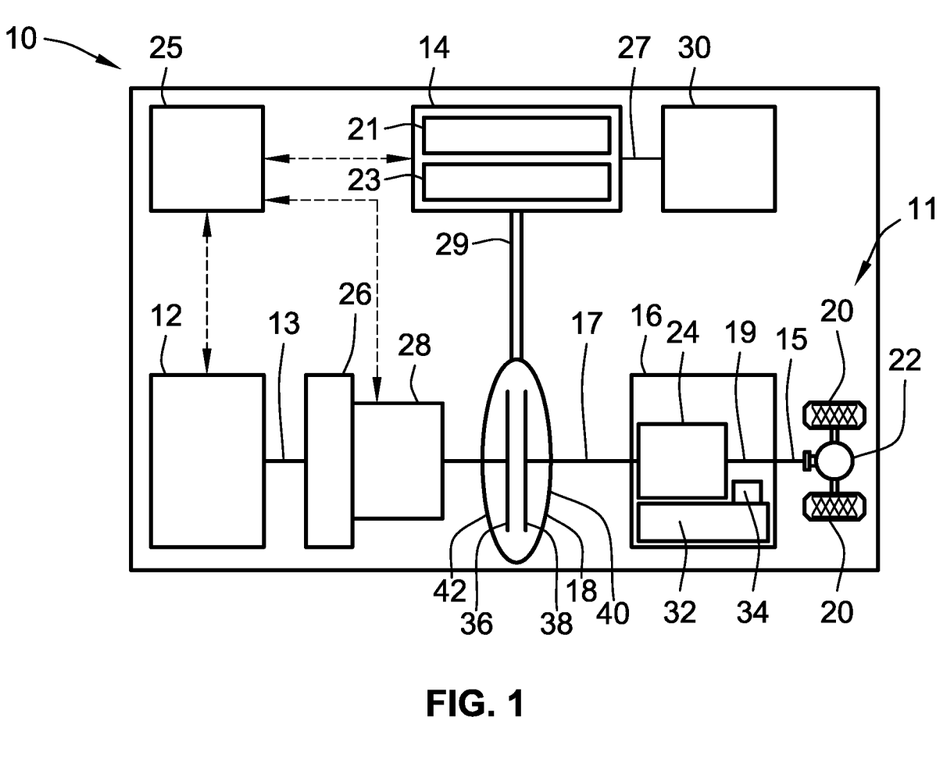
FIG. 1 is a schematic illustration of a representative electric-drive motor vehicle equipped with a hybrid powertrain having an electric traction motor powered by a rechargeable traction battery pack in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure may be practiced. In the same vein, implementation of the present concepts into a hybrid electric powertrain should also be appreciated as an exemplary application of the novel concepts disclosed herein. As such, it will be understood that aspects and features of the present disclosure may be applied to other vehicle powertrain architectures, incorporated into any logically relevant type of motor vehicle, and utilized for both automotive and non-automotive applications alike. Lastly, only select components have been shown and will be described in additional detail herein. Nevertheless, the vehicles, battery modules, and manufacturing systems discussed below may include numerous additional and alternative features, and other available peripheral components, for carrying out the various methods and functions of this disclosure.

The representative vehicle powertrain system is shown in FIG. 1 with a prime mover—represented herein by a restartable internal combustion engine (ICE) assembly 12 and an electric motor/generator unit 14—that is drivingly connected to a driveshaft 15 of a final drive system 11 by a multi-speed automatic power transmission 16. The engine 12 transfers power, preferably by way of torque via an engine crankshaft 13 ("engine output member"), to an input side of the transmission 16. According to the illustrated example, the ICE assembly 12 rotates an engine-driven torsional damper assembly 26 and, through the torsional damper assembly 26, an engine disconnect device 28. This engine disconnect device 28, when operatively engaged, transmits torque received from the ICE assembly 12 by way of the damper 26 to input structure of the TC assembly 18. As the name implies, the engine disconnect device 28 may be selectively disengaged to drivingly disconnect the engine 12 from the motor 14 and transmission 16.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28. It may be preferable, for at least some embodiments, that the engine disconnect device 28 comprise an active clutching mechanism, such as a controller-actuated selectable one-way clutch (SOWC) or friction-plate clutch, or a passive clutching mechanism, such as a ratchet-and-pawl or sprag-type freewheel OWC assembly.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit 14 that operatively connects via a motor support hub, shaft, or belt 29 ("motor output member") to torque converter 18, and via torque converter 18 to an input shaft 17 ("transmission input member") of the transmission 16. The motor/generator unit 14 may be directly coupled to a TC input shaft or drivingly mounted to a housing portion of the torque converter 18. The electric motor/generator unit 14 is composed of an annular stator assembly 21 circumscribing and concentric with a cylindrical rotor assembly 23. Electric power is provided to the stator 21 through electrical conductors or cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including P0, P1, P2.5, P3 and P4 hybrid powertrains, any of which may be adapted for an REV, PHEV, range-extended hybrid vehicle, fuel-cell hybrid vehicle, FEVs, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the impeller and turbine blades 36, 38. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

Figure 2:
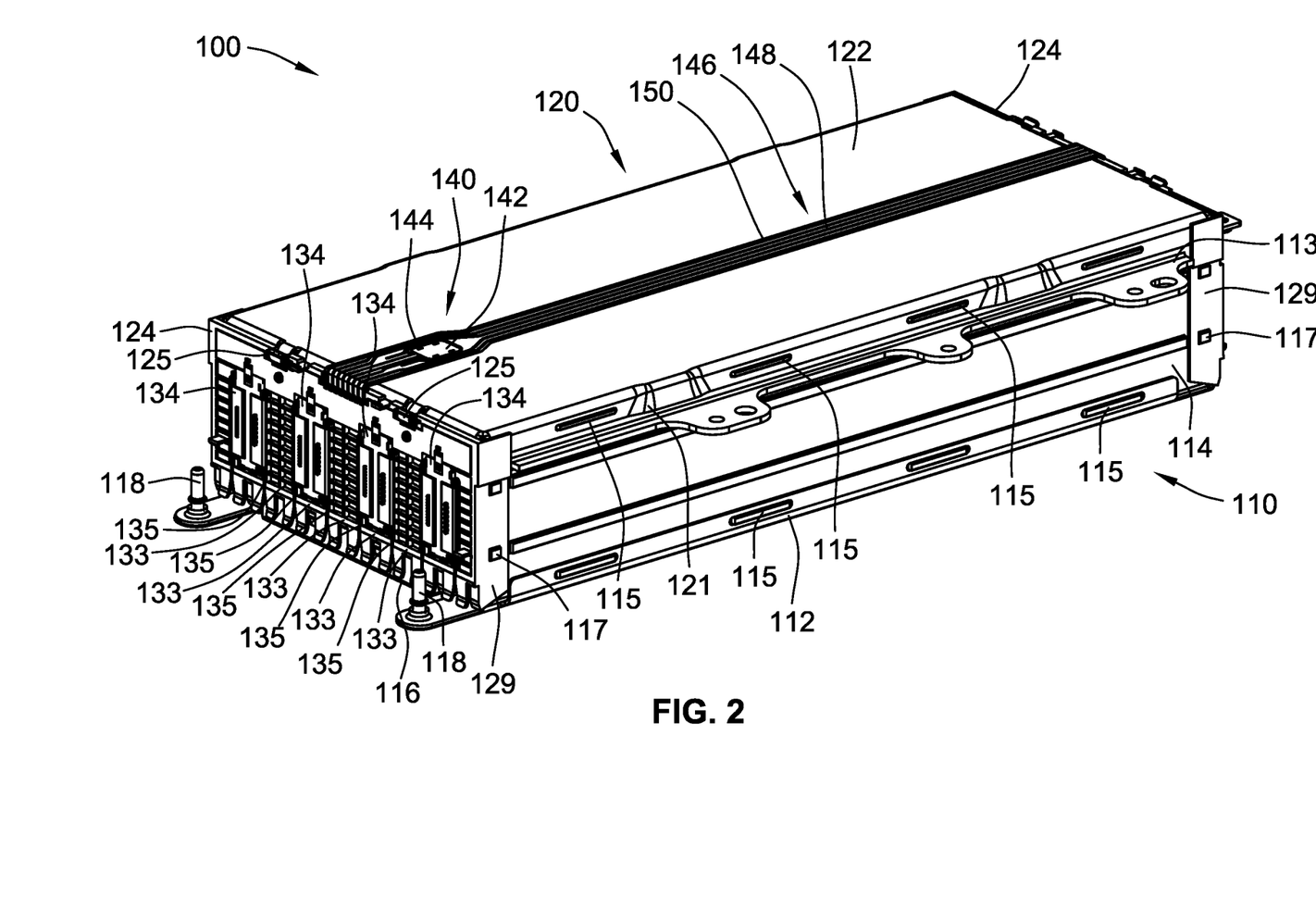
FIG. 2 is an elevated, perspective view illustration of a representative battery module with an integrated electrical ICB assembly and an internally packaged stack of battery pouch cells with cell tabs bent in accordance with aspects of the present disclosure.

Turning next to FIG. 2, there is shown a segment of a rechargeable energy storage system (RESS) that is adapted for storing and supplying high-voltage electrical energy used, for example, to propel an electric-drive vehicle, such as hybrid electric vehicle 10 of FIG. 1. This RESS may be a deep-cycle, high-ampere capacity vehicle battery system rated for approximately 350 to 800 VDC or more, for example, depending on a desired vehicle range, gross vehicle weight, and power ratings of the various accessory loads drawing electrical power from the RESS. To this end, the RESS employs one or more high-voltage, high-energy-density battery packs, such as traction battery pack 30 of FIG. 1, which is electrically connectable to one or more polyphase permanent magnet (PM) electric machines, such as traction motor 14. Each traction battery pack incorporates an aggregation (e.g., 100's or 1000's) of discrete electrochemical cells connected in series and/or parallel to achieve desired total voltage and total current requirements.

According to the representative configuration, the traction battery pack is generally composed of an array of lithium-ion battery modules, an example of which is illustrated at 100 in FIG. 2. These battery modules 100 are arranged in rows and columns, and buttressed on a battery support tray (not shown) that provides subjacent support for the battery pack during vehicle operation. Aspects of the disclosed concepts may be similarly applicable to other electric storage unit architectures, including those employing nickel metal hydride (NiMH) batteries, lead acid batteries, lithium polymer batteries, or other applicable types of rechargeable electric battery. Each battery module 100 may include a stack 102S of electrochemical battery cells, such as pouch-type lithium ion (Li-ion) or Li-ion polymer (LiPo) battery pouch cells 102 of FIG. 3, for example. For simplification of design and maintenance, and for reduction in cost and assembly time, each battery module 100 in the RESS may be substantially identical to one another.

Figure 3:
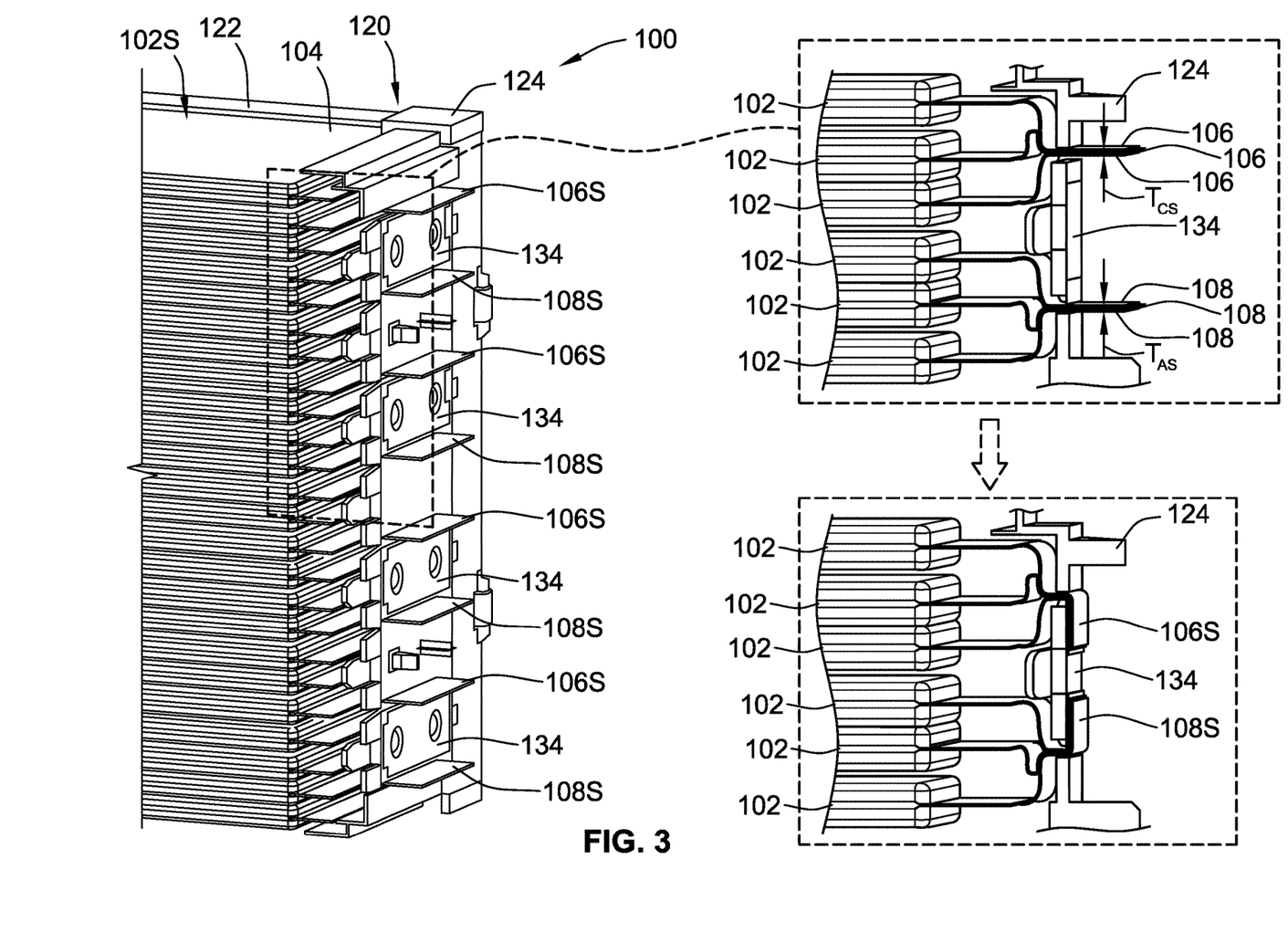
FIG. 3 is a perspective view illustration of the representative battery module of FIG. 2 with the module base plate and sidewalls removed to better illustrate the stacked battery pouch cells, and inset views showing the battery cell tabs before and after being bent in accord with aspects of the disclosed concepts.

An individual lithium-ion battery module 100 may be typified by multiple battery cells 102 (e.g., 20-30) that are stacked in side-by-side facing relation with one another and connected in parallel or series for storing and supplying electrical energy. A battery cell may be a multi-layer construction that is provided with an outer battery casing, which is represented in the drawings by an envelope-like pouch 104 (FIG. 3). The respective sides of the pouch 104 may be formed of polymer foam, aluminum sheet metal, or other suitable material. Both sides of an aluminum pouch may be coated with a polymeric material that insulates the metal from the cell elements and from any adjacent cells. These two sides are connected, e.g., via welding or crimping or other appropriate joining technique, to generally enclose therein a liquid electrolyte composition that conducts positive Lithium ions between working and reference electrodes. Extending outwardly from opposing longitudinal ends of the pouch 104 are positive (+) and negative (−) electrical terminals 106 and 108, respectively, for making electrical connections with positive and negative electrodes (not visible) packaged within the internal volume of pouch 104. While shown as a silicon-based, Li-ion "pouch cell" battery, the battery cells 102 may be adapted to other constructions, including cylindrical and prismatic constructions, and may be substantially identical to one another.

With collective reference to FIGS. 2 and 3, the battery module 100 stores the electrochemical battery cells 102 inside a protective, electrically insulating battery module housing 110. Battery module housing 110 may be a rigid, multi-part construction assembled from a flanged housing base 112 with a pair of elongated module sidewalls 114 that project generally orthogonally from the base 112. Once properly arranged and mounted, the stacked battery cells 102 are supported on the housing base 112 and sandwiched between the module sidewalls 114. For ease of manufacture and assembly, the sidewalls 114 may be substantially identical to each other, e.g., both formed from an electrically insulated aluminum or a rigid plastic material with snap fastener projections 115 and 117 for operatively aligning and mechanically connecting the sidewalls 114 with the other protective exterior segments of the battery module 100. Two coplanar mounting brackets 113 extend transversely from the module housing 110, each integrally formed with and projecting at a right angle from a respective module sidewall 114.

A cooling plate 116 is mounted underneath the stacked battery cells 102, seated generally flush against the bottom surface of the housing base 112, to selectively transfer heat out of the battery module 100. This cooling plate 116 is fabricated with one or more coolant channels (not visible in the views provided) that pass therethrough a coolant fluid received via coolant ports 118. The module sidewalls 114 and cooling plate 116 may be fluidly sealed and mechanically attached to the housing base 112, e.g., via snap fasteners and a seal-forming foam. While shown with a generally rectangular-polyhedron shape, it is envisioned that the battery module housing 110 may take on other desired sizes and shapes to accommodate alternative applications with different packaging and design constraints. In the same vein, the module housing 110 may be assembled from greater or fewer segments than that which is shown in the drawings; alternatively, the housing 110 may be molded and machined as a single-piece or bipartite, unitary structure.

Operatively aligning and electrically interconnecting the battery cells 102 is an integrated interconnect board (ICB) assembly 120 that is mounted on top of the battery module housing 110. In accord with the illustrated example, the integrated ICB assembly 120 provides a protective outer jacket that is generally defined by a flanged central cover 122 with a pair of flanged endwalls 124 that project generally orthogonally from opposing ends of the central cover 122. The central cover 122 is formed from a rigid polymeric material with integral lateral flanges 121 having elongated snap fastener slots, which receive therein snap fastener projections 115 of the housing sidewalls 114. A pair of snap-in hooks 125 projects from each longitudinal end of the cover 122 and receives therein mounting pivot pins (not labelled) of the ICB endwalls 124. ICB assembly endwalls 124 may be structurally identical, both formed from a rigid polymeric material that is similar to or distinct from the polymeric material used to fabricate the ICB cover 122. Each endwall 124 is fabricated with integral mounting flanges 129 that have snap fastener holes, which receive therein snap fastener projections 117 of the housing sidewalls 114. Like the module housing 110, the ICB assembly 120 of FIGS. 2 and 3 may be assembled from greater or fewer than three protective outer segments, namely central cover 122 and endwalls 124; alternatively, the ICB assembly 120 may be molded and machined as a single-piece, unitary structure.

Each of the ICB assembly endwalls 124 is segmented into a series of elongated, mutually parallel endwall plates 133 that are arranged side-by-side in a vertical column-like fashion. These endwall plates 133 interleave with and are separated from one another by elongated slots 135. Each of the endwall plates 133 is integrally formed with a succession of flexible snap fastener tabs (not labelled) that project downwardly from a bottom edge of the endwall 124. These tabs slidably engage with and press-fit onto the cooling plate 116; in so doing, the integrated ICB assembly 120 mechanically attaches to the remainder of the battery module housing 110. In the illustrated embodiment, the ICB assembly 120 may be hermetically sealed to the module housing 110. Once the ICB assembly 120 is properly mounted, the central cover 122 is positioned in spaced facing relation to the housing base 112 with the battery cells 102 interposed between the ICB endwalls 124.

After mounting the integrated ICB assembly 120, the electrical terminals 106, 108 of the battery cells 102 are electrically connected to electrical busbar plates 134 mounted on the exterior faces of the ICB endwalls 124. As shown, each electrical busbar plate 134 is fabricated from an electrically conductive metallic material (e.g., copper) that is fashioned into a generally rectangular panel, which is then mounted on an exterior surface of one of the endwalls 124, e.g., via mounting tabs, adhesives, and/or fasteners. Likewise, the electrical battery cell tab 106, 108 are also fabricated from electrically conductive metallic materials (e.g., Al and Cu) and bent into L-shaped terminals, an exterior portion of which lays flush again and solders, welds, or clips to one of the busbar plates 134. The inset views of FIG. 3 illustrate the battery cell tab 106, 108 prior to bending (top inset view) and after bending (bottom inset view). A pair of L-shaped inter-module bussing brackets (not labelled) are mounted on one of the ICB endwalls 124; these inter-module bussing brackets cooperatively electrically connect the battery module 100 to an adjacent battery module.

In addition to providing a protective outer jacket and electrically interconnecting the battery cells 102, the integrated ICB assembly 120 also provides sensing, operating, and electrical isolation functionalities. Such functionality may be provided by an integrated circuit (IC) sensing assembly 140 that is mounted on the central cover 122 or, for some alternative configurations, on one of the endwalls 124. The IC sensing assembly 140 is fabricated with multiple sensing devices 142, such as current, voltage, and/or temperature sensors, which are operable to sense operational characteristics of the battery cells 102. A flexible printed circuit board (PCB) 144 is shown mounted on the central cover 122, supporting thereon the sensing devices 142. A flexible electrical track 146 with multiple electrical traces 148 borne by an electrically insulating track sheet 150 electrically connects the flexible PCB 144 and, thus, the sensing devices 142 to the battery cells 102 via the busbar connectors 134.

To electrically mate the individual battery cell tabs 106, 108 with the busbar plates 134, a two-stage plunger press system 150 or 250 (also referred to herein as "metalworking system") bends the battery cell tabs 106, 108 (also referred to herein as "metallic workpieces") into abutting engagement with the busbar plates 134. While differing in appearance, it is envisioned that the features and options disclosed herein with reference to the plunger press system 150 of FIGS. 4A and 4B may be incorporated, singly or in any combination, into the example plunger press system 250 of FIG. 5, and vice versa. As a point of similarity, both the plunger press system 150 of FIGS. 4A and 4B and the plunger press system 250 of FIG. 5 are generally composed of a telescoping pair of die-forming plungers: a first-stage (first) plunger 152 (FIG. 4A) and 252 (FIG. 5), and a second-stage (second) plunger 154 (FIG. 4B) and 254 (FIG. 5) that translated rectilinearly into and slides at least partially through the first-stage plunger 152, 252. By way of demarcation, the plunger press system 150 is designed to bend four mating pairs of battery cell tab stacks 106S, 108S at one time, whereas the plunger press system 250 is designed to bend two mating pairs of battery cell tab stacks 106S, 108S at a given time. In the illustrated example, a mating pair includes one stack 106S of three (3) positive battery cell tabs 106, and one stack 108S of three (3) negative battery cell tabs 108 (i.e., one pair=two stacks=six cell tabs) that are mated to the same electrical busbar plate 134. It should be appreciated that disclosed vertical plunger systems may be modified to simultaneously bend greater or fewer pairs of neighboring cell tab stacks than what is shown in the drawings, for example, to accommodate different battery module sizes and configurations.

Figure 4A:
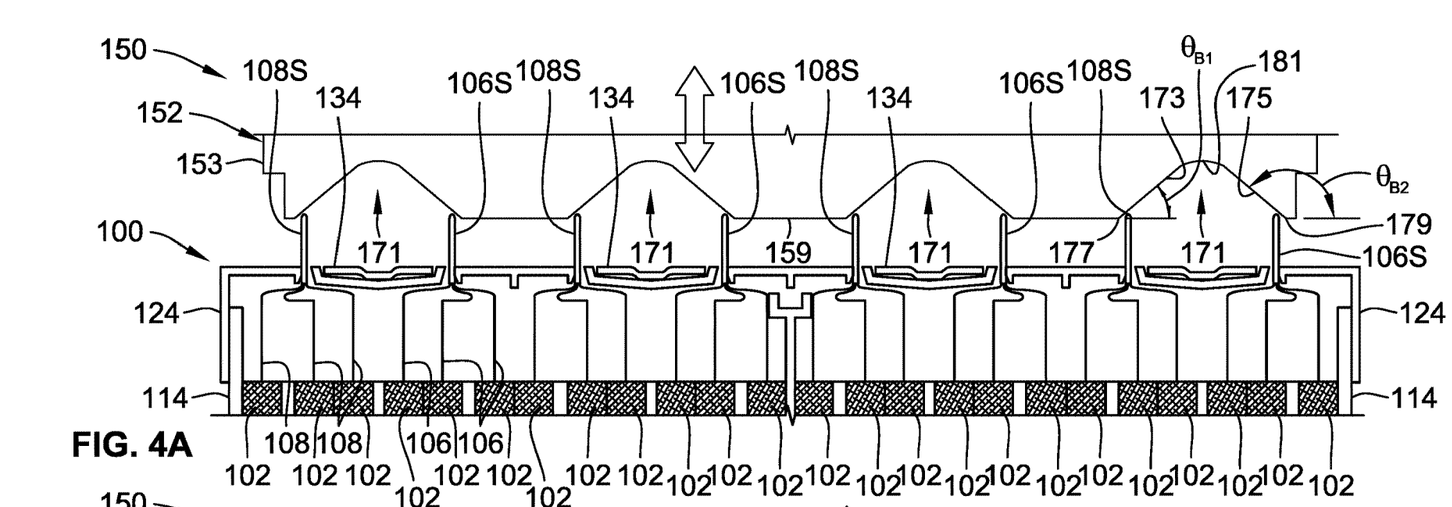
FIGS. 4A and 4B are schematic, side-view illustrations of a representative two-stage plunger press system bending the battery cell tabs of FIGS. 2 and 3 with a first-stage plunger (FIG. 4A) and a second stage plunger (FIG. 4B) in accord with aspects of the disclosed concepts.
Figure 4B:
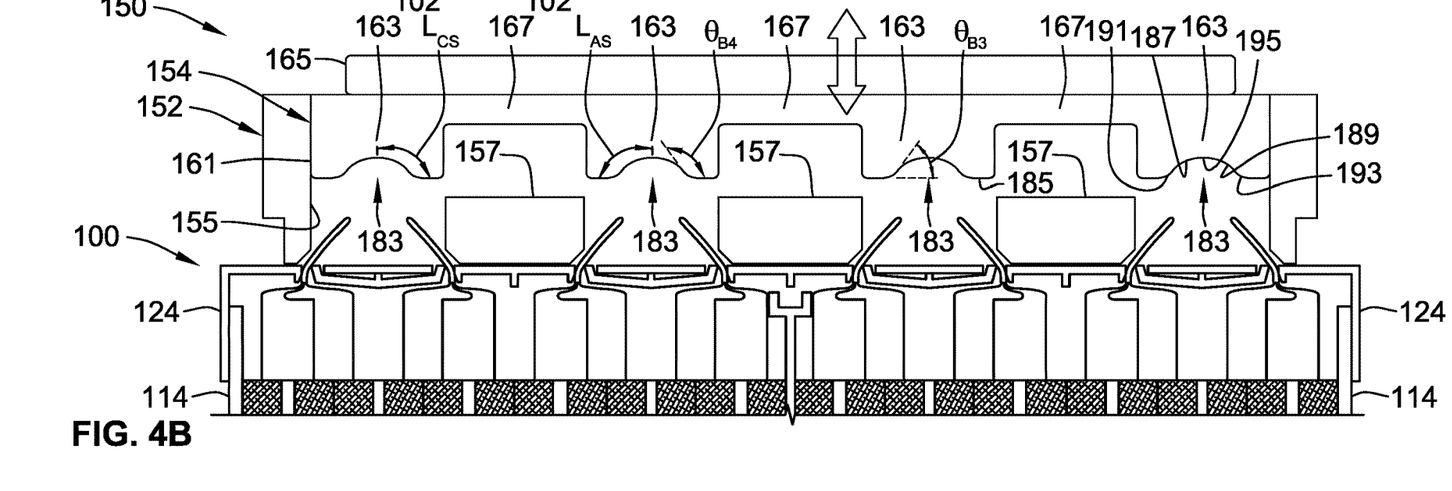
Figure 5:
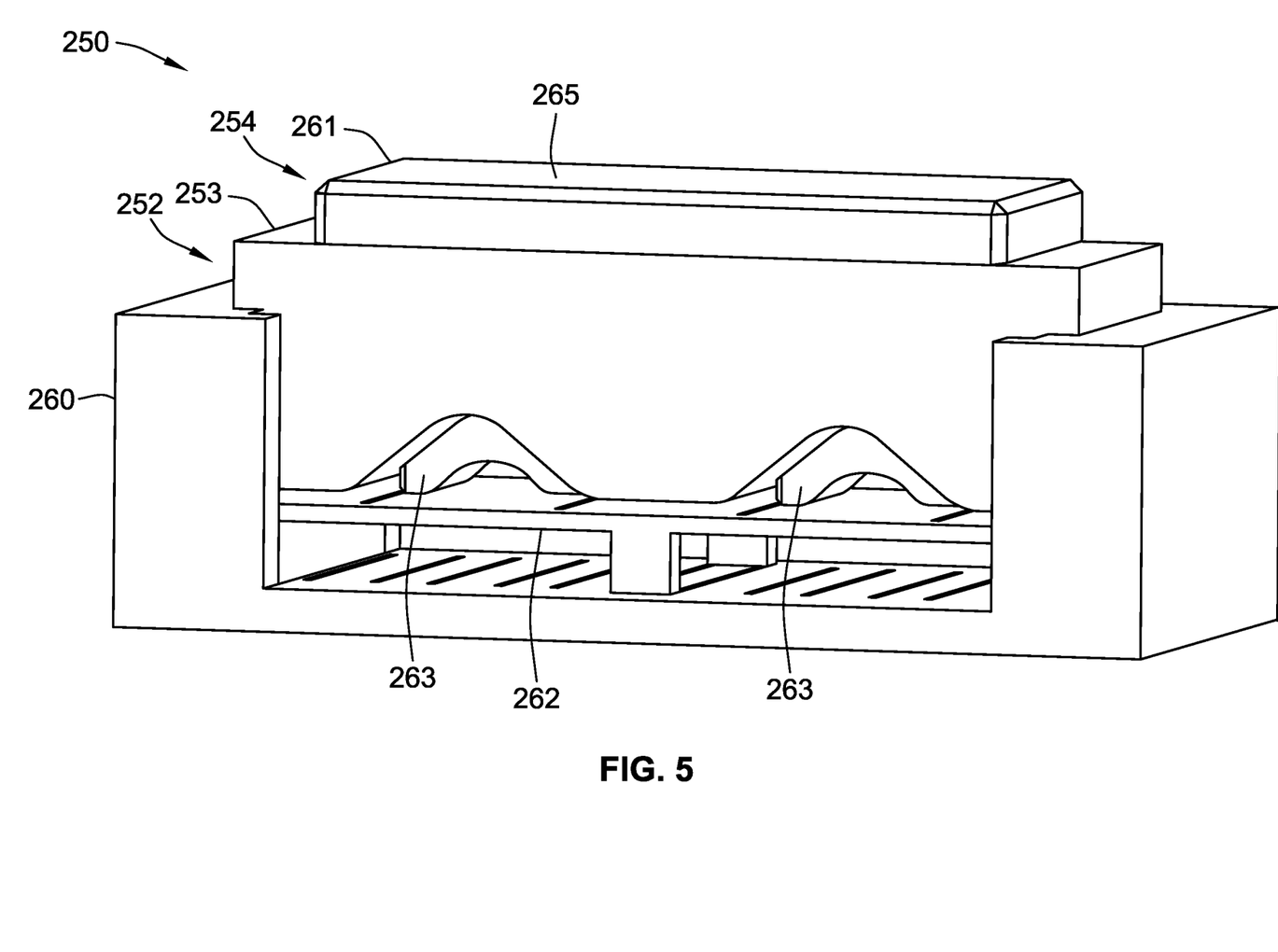
FIG. 5 is a perspective view illustration of another representative two-stage plunger press system in accord with aspects of the disclosed concepts.

With reference to FIGS. 4A and 4B, the first-stage plunger 152 includes or, in at least some architectures, consists essentially of a unitary, single-piece (first) plunger body 153. To ensure sufficient structural resilience for systematic and repeated battery cell tab bend operations, the plunger body 153 is fabricated from a rigid and wear-resistant material, such as high-strength plastics (e.g., thermoplastic polycarbonate), electrically insulated metallic materials (e.g., dielectric-polymer coated steel), or advanced ceramics (e.g., alumina or silicon carbide). The first-stage plunger's body 153 is a hollow structure, with a rectangular-polyhedron shape and a central plunger cavity 155 that extends completely through the plunger body 153. Opposing top and bottom ends of the cavity 155 terminate at openings through top-most and bottom-most surfaces of the plunger body 152, respectively. In the illustrated example, cavity 155 is composed of a series of (four) laterally spaced leg channels interconnected by a manifold cavity section. One or more shoulder stops 157 (FIG. 4B) are integrally formed with the plunger body 153 and extend transversely across the plunger cavity 155. During translation of the second-stage plunger 154 through the first-stage plunger 152, these shoulder stops 157 abut the second plunger's body 161 to thereby limit the downward travel of the second plunger 154 through the plunger cavity 155 during the cell tab bend operation. As a point of clarification, the side-view illustration of FIG. 4A shows the exterior side surface of the plunger body 153, whereas the side-view illustration of FIG. 4B is a sectional view provided to illustrate the cross-sectional geometry of the plunger cavity 155. For at least some architectures, the plunger cavity 155 is omitted, and the first and second-stage plungers 152, 154 may be located immediately adjacent each other and juxtaposed in face-to-face contact.

Similar to the first-stage plunger 152 of FIGS. 4A and 4B, the second-stage plunger 154 includes or, in at least some architectures, consists essentially of a unitary, single-piece (second) plunger body 161 that is fabricated from a rigid and wear-resistant plastic, electrically insulated metal, or advanced ceramic, including any of the examples presented in the preceding paragraph. The second-stage plunger's body 161 is a toothed structure, with at least one or, as shown, a series of mutually parallel legs 163. Each elongated "plinth-like" leg 163 is integrally formed with and projects generally orthogonally (in a downward direction in FIG. 4B) from a plunger crown 165, spaced from adjacent legs 163 by an intermediate web extension 167. While shown with four identically shaped legs 163, it should be appreciated that the second-stage plunger 154 may be provided with greater or fewer legs, each of which may take on a common or a distinct structural configuration.

To simultaneously bend the mating pair or pairs of cell tab stacks 106S, 108S, the first-stage plunger 152 is formed with at least one or, as shown, four die cavities 171 that are recessed into a downward-facing, workpiece engaging (first) contact face 159 of the plunger body 153. While not per se required, the illustrated die cavities 171 may be substantially identical to help ensure consistent part-to-part bend geometries; thus, for purposes of brevity and ease of reference, the structure of all four die cavities 171 may be described below with reference to the right-most die cavity 171 in FIG. 4A. The die cavity 171 (also referred to herein as "first die cavity" or "third die cavity") includes an anode-tab or negative-tab bending (first or fifth) cavity surface 173 that contacts, presses against, and bends the stack 108S of negative battery cell tabs 108 a clockwise (first) bend angle $\theta_{B1}$ (e.g., approximately 35-55 degrees from the contact face 159). Juxtaposed with the anode-tab bending cavity surface 173 is a cathode-tab or positive-tab bending (second or sixth) cavity surface 175 that contacts, presses against, and bends the stack 106S of positive battery cell tabs 106 a counterclockwise (second) bend angle $\theta_{B2}$ (e.g., approximately 125-145 degrees from the contact face 159) towards the neighboring stack 108S.

To help align the battery cell tab stacks 106S, 108S with the die cavities 171 for the first stage of the bending operation, as well as accommodate part-to-part variances and outwardly bowing terminal stacks, a left-side (first) arcuate alignment surface 177 adjoins with, extends between, and connects the left-side cavity surface 173 to the downward-facing contact face 159. In the same vein, a right-side (second) arcuate alignment surface 179 adjoins with, extends between, and connects the right-side cavity surface 175 to the contact face 159. During the downward stroke of the plunger's reciprocating linear motion, the arcuate surfaces 177, 179 will be first to contact the uppermost tips of the cell tab stacks 106S, 108S and concomitantly direct the stacks towards the interior of the die cavity 171. As shown, an uppermost (first) arcuate inflection surface 181 adjoins with, extends between and connects the left-side and right-side cavity surfaces 173, 175.

Similar to the first-stage plunger 152 of FIG. 4A, the second-stage plunger 154 shown in FIG. 4B is formed with at least one or, as shown, four die cavities 183 that are recessed into a downward-facing, workpiece engaging (second) contact face 185 of the plunger body legs 163. In accord with the illustrated example, the illustrated die cavities 183 may be substantially identical to help ensure consistent part-to-part bend geometries; thus, for purposes of brevity and ease of reference, the structure of all four die cavities 183 may be described below with reference to the right-most die cavity 183 in FIG. 4B. The die cavity 183 (also referred to herein as "second die cavity" or "fourth die cavity") includes an anode-tab bending (third or seventh) cavity surface 187 that contacts, presses against, and bends the stack 108S of negative battery cell tabs 108 a clockwise (third) bend angle $\theta_{B3}$ (e.g., approximately 45-65 degrees from the contact face 185). Juxtaposed with the anode-tab bending cavity surface 187 is a cathode-tab bending (fourth or eighth) cavity surface 189 that contacts, presses against, and bends the stack 106S of positive battery cell tabs 106 a counterclockwise (fourth) bend angle $\theta_{B4}$ (e.g., approximately 115-135 degrees from the contact face 159) towards the neighboring stack 108S.

To help align the battery cell tab stacks 106S, 108S with the die cavities 183 of the second plunger 154 during the second stage of the bending operation, a left-side (third) arcuate alignment surface 191 adjoins with, extends between, and connects the left-side cavity surface 187 to the downward-facing contact face 185. In the same vein, a right-side (fourth) arcuate alignment surface 193 adjoins with, extends between, and connects the right-side cavity surface 189 of the die cavity 183 to the contact face 185. In addition, an uppermost (second) arcuate inflection surface 195 adjoins with, extends between, and connects the left-side and right-side cavity surfaces 187, 189. During the downward stroke of the second plunger's reciprocating linear motion, the first plunger 152 is in situ and, holding the cell tab stacks 106S, 108S (as seen in FIG. 4A) at an oblique bend angle. The second plunger 154, in tandem with the first plunger 152, contacts the electrical terminals 106, 108; the arcuate surfaces 191, 193 first contact the upper-most tips of the cell tab stacks 106S, 108S and concomitantly direct the stacks towards the interior of the die cavity 171. For alternative configurations, e.g., in which the die cavities 171 and 183 are markedly wider than the distance between the mating pair of cell tab stacks 106S, 108S for that cavity, the arcuate surfaces 177, 179, 191, 193 may be eliminated from the first-stage and second-stage plungers 152, 154. Likewise, the bend angles of the cavity surfaces may be steeper or shallower than what is shown in the drawings without departing from the intended scope of this disclosure.

As indicated above, a top-face to bottom-face (first) stack thickness TAS (FIG. 3) of an aluminum anode tab stack 108S may be thicker than a top-face to bottom-face (second) stack thickness $T_{CS}$ of a copper cathode tab stack 106S, e.g., due to larger gauge requirements for aluminum terminals to maintain an equivalent current capacity with their mating copper terminals (Cu is more conductive than Al). In such cases, the anode-tab bending cavity surface 187 may be configured to bend the stack 108S a shorter bend distance than the bend distance imparted by the cathode-tab bending cavity surface 189 on the stack 106S. To achieve this feature, a midline-to-edge (third) arc length LAS of the anode cavity surface 187 may be shorter than a midline-to-edge (fourth) arc length $L_{CS}$ of the cathode cavity surface 189. In doing so, the anode-engaging (left-hand) side of each leg 163 may be shorter (e.g., about 0.6 mm) than the cathode-engaging (right-hand) side of the leg 163. Conversely, the cavity surfaces 173, 175 may share a common length. As another option, a left-side length of the plunger leg 163 from the crown 165 to the contact face 185 adjoining the cavity surface 187 may be shorter than a right-side length of the plunger leg 163 from the crown 165 to the contact face 185 adjoining the cavity surface 189. In so doing, there is a larger gap distance between the left-hand side of plunger leg 163 and the ICB endwall 124 in FIGS. 4A and 4B for the cell tab stack 108S than on the right-hand side of plunger leg 163 for the cell tab stack 106S.

Turning next to FIG. 5, wherein like reference numbers are used to denote similar parts to those discussed above in FIGS. 4A and 4B, the two-stage (vertical) plunger press system 250 also includes first-stage and second-stage plungers 252 and 254, respectively, each of which is shown fabricated with a discrete, structurally rigid single-piece plunger body 253 and 261, respectively. As mentioned above, the plungers 252, 254 may include any of the features and options discussed herein with reference to the counterpart plungers 152, 154. For instance, the first-stage plunger's body 253, like plunger body 153, is a hollow structure with a central plunger cavity (not visible in this view) that extends through the plunger body 253 and receives therein the second-stage plunger 254. Likewise, the second-stage plunger 254 is a toothed structure typified by a series of (two) mutually parallel legs 263 that project downwardly from a plunger crown 265. The test stand 260 and interior platform 262 may provided for additional stability or, alternatively, may be removed altogether from the embodiment of FIG. 5.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A metalworking system for forming a first metallic workpiece and a second metallic workpiece, the metalworking system comprising:
   a first plunger including a first plunger body with a plunger cavity extending through the first plunger body and a first die cavity recessed into a first contact face of the first plunger body, the first die cavity including a first cavity surface configured to contact and bend the first metallic workpiece a first bend angle, and a second cavity surface configured to contact and bend the second metallic workpiece a second bend angle; and
   a second plunger including a second plunger body with a second die cavity recessed into a second contact face of the second plunger body, the second die cavity including a third cavity surface configured to contact and bend the first metallic workpiece a third bend angle, and a fourth cavity surface configured to contact and bend the second metallic workpiece a fourth bend angle,
   wherein the second plunger body is movably received in the first plunger body and passes through the plunger cavity such that the second plunger bends the first metallic workpiece and the second metallic workpiece in tandem with the first plunger bending the first metallic workpiece and the second metallic workpiece.

2. The metalworking system of claim 1, wherein the first bend angle of the first cavity surface is approximately 35-55 degrees from the first contact face, and the second bend angle of the second cavity surface is approximately 125-145 degrees from the first contact face.

3. The metalworking system of claim 1, wherein the third bend angle of the third cavity surface is approximately 45-65 degrees from the second contact face, and the fourth bend angle of the fourth cavity surface is approximately 115-135 degrees from the second contact face.

4. The metalworking system of claim 1, wherein the first die cavity further includes a first arcuate surface extending between and connecting the first cavity surface to the first contact face, and a second arcuate surface extending between and connecting the second cavity surface to the first contact face.

5. The metalworking system of claim 4, wherein the first die cavity further includes a first arcuate inflection surface extending between and connecting the first cavity surface and the second cavity surface.

6. The metalworking system of claim 4, wherein the second die cavity further includes a third arcuate surface extending between and connecting the third cavity surface to the second contact face, and a fourth arcuate surface extending between and connecting the fourth cavity surface to the second contact face.

7. The metalworking system of claim 6, wherein the second die cavity further includes a second arcuate inflection surface extending between and connecting the third cavity surface and the fourth cavity surface.

8. The metalworking system of claim 1, wherein the second plunger body includes a first leg and a second leg projecting generally orthogonally from a plunger crown, wherein the second die cavity is recessed into the first leg, and a fourth die cavity is recessed into the second leg.

9. The metalworking system of claim 8, wherein the first plunger includes a shoulder stop extending across the plunger cavity and configured to abut the second plunger body to thereby limit a length of travel of the second plunger through the plunger cavity.

10. The metalworking system of claim 1, wherein the first metallic workpiece includes a first metal tab stack having a first thickness, and the second metallic workpiece includes a second metal tab stack having a second thickness smaller than the first thickness, and wherein the third cavity surface is configured to bend the first metal tab stack a first arcuate bend distance, and the fourth cavity surface is configured to bend the second metal tab stack a second bend distance greater than the first arcuate bend distance.

11. The metalworking system of claim 10, wherein a third length of the third cavity surface is shorter than a fourth length of the fourth cavity surface of the second die cavity.

12. The metalworking system of claim 11, wherein a first length of the first cavity surface is approximately equal to a second length of the second cavity surface of the first die cavity.

13. The metalworking system of claim 1, wherein the first plunger further includes a third die cavity recessed into the first contact face and including a fifth cavity surface configured to contact and bend a third metallic workpiece the first bend angle, and a sixth cavity surface configured to contact and bend a fourth metallic workpiece the second bend angle.

14. The metalworking system of claim 13, wherein the second plunger further includes a fourth die cavity recessed into the second contact face and including a seventh cavity surface configured to contact and bend the third metallic workpiece the third bend angle, and an eighth cavity surface configured to contact and bend the fourth metallic workpiece the fourth bend angle.

15. A method for forming a first metallic workpiece and a second metallic workpiece, the method comprising:
   aligning, with the first metallic workpiece and the second metallic workpiece, a first plunger including a first plunger body with a plunger cavity extending through the first plunger body and a first die cavity recessed into a first contact face of the first plunger body, the first die cavity including a first cavity surface configured to press against and bend the first metallic workpiece a first bend angle, and a second cavity surface configured to press against and bend the second metallic workpiece a second bend angle;

aligning, with the first metallic workpiece and the second metallic workpiece, a second plunger including a second plunger body with a second die cavity recessed into a second contact face of the second plunger body, the second die cavity including a third cavity surface configured to press against and bend the first metallic workpiece a third bend angle, and a fourth cavity surface configured to press against and bend the second metallic workpiece a fourth bend angle;

pressing the first plunger against and thereby simultaneously bending the first metallic workpiece and the second metallic workpiece towards each other; and pressing the second plunger, by moving the second plunger body into the first plunger body and through the plunger cavity, against and thereby simultaneously bending the first metallic workpiece and the second metallic workpiece towards each other in tandem with the first plunger bending the first metallic workpiece and the second metallic workpiece.

16. The method of claim 15, wherein the first bend angle of the first cavity surface is approximately 35-55 degrees from the first contact face, and the second bend angle of the second cavity surface is approximately 125-145 degrees from the first contact face.

17. The method of claim 15, wherein the third bend angle of the third cavity surface is approximately 45-65 degrees from the second contact face and the fourth bend angle of the fourth cavity surface is approximately 115-135 degrees from the second contact face.

18. The method of claim 15, wherein the first die cavity further includes a first arcuate surface extending between and connecting the first cavity surface to the first contact face, and a second arcuate surface extending between and connecting the second cavity surface to the first contact face, and wherein the second die cavity further includes a third arcuate surface extending between and connecting the third cavity surface to the second contact face, and a fourth arcuate surface extending between and connecting the fourth cavity surface to the second contact face.

19. The method of claim 15, wherein a first length of the first cavity surface is approximately equal to a second length of the second cavity surface, and wherein a third length of the third cavity surface is shorter than a fourth length of the fourth cavity surface.

20. The method of claim 15, wherein the first metallic workpiece and the second metallic workpiece include a first metal tab stack and a second metal tab stack, respectively, the first metal tab stack having a first thickness, and the second metal tab stack having a second thickness smaller than the first thickness, and wherein the third cavity surface bends the first metal tab stack a first bend distance, and the fourth cavity surface bends the second metal tab stack a second bend distance greater than the first bend distance.

\* \* \* \* \*